United States Patent Office 3,025,256
Patented Mar. 13, 1962

3,025,256

INSULATION ADHESIVE COMPOSITION WITH ACRYLATE POLYMER AND ALKALI METAL SILICONATE

Rudolph B. Janota and Raymond T. Gavin, Lansing, Ill., assignors to Swift & Company, Chicago, Ill., a corporation of Illinois No Drawing. Filed June 11, 1956, Ser. No. 590,412
12 Claims. (Cl. 260—29.6)

This invention relates to a new and useful improvement in insulation adhesives and finishes and provides an improved product having many and varied uses formerly not obtainable in a single composition. The product is particularly adapted to use as a coating material for the walls of large, commercial size refrigerators.

Various food industries, among them the packing industry, employ large refrigerators for cooling and holding their products prior to marketing. The material, frequently cork or foam glass or foamed polystyrene, making up the insulated walls of these coolers are coated with suitable material primarily to protect the insulating material from water and to provide a smooth surface which may be readily cleaned. Insulating materials, on becoming moistened, will lose their insulating properties to a considerable extent. Hence, the coating composition should substantially forestall the passage of liquid water, i.e., be waterproof. The opposite side (the outer surface) of the insulated wall is customarily covered with what is known as a water vapor barrier which is frequently formed of an asphalt cutback or hot pour asphalt. The hot pour asphalt is applied, as its name indicates, at an elevated temperature. The cutback material is an asphalt composition containing an organic solvent which evaporates upon application, leaving a water vapor proof membrane. The purpose of this water vapor barrier is to prevent the passage of water vapor from the warm air of the atmosphere into the insulating wall. The pressure of the water vapor in the higher temperature outside air is generally greater than the pressure of the water vapor in the refrigerator and hence the vapor tends to pass into the interior of the refrigerator. In the absence of a barrier, the water vapor would permeate the insulated wall and possibly reach its dew point in the interior of the wall and condense, with the result that the thermal conductivity of the wall would be increased. Furthermore, if the water vapor should condense at the interface of the insulating wall and its interior coating, it is quite likely that in time the coating would weaken, causing cracks to appear, and in some instances collapsing the wall.

Inasmuch as water vapor may, despite precautions, become entrapped in the insulated wall, it becomes desirable to have means to facilitate its escape. It is for this purpose that the waterproof coat covering the inner side of the insulated wall is preferably capable of transmitting water vapors. This latter property should not be confused with waterproofness, as waterproofness is concerned with the ability of the material to prevent the passage of liquid water, while the vapor transmitting characteristics of the material pertains to the ability of the material to transmit water vapor. A satisfactory coating material for cooler use should have both of these seemingly opposed characteristics. A high vapor transmitting characteristic is desirable to permit the escape of any moisture that may enter the insulating wall. On the other hand, the coating material should be substantially waterproof to permit the washing down of the walls without danger of water becoming entrapped in the insulating material.

Cement plaster has long been used because it has generally satisfactory waterproof and vapor transmitting characteristics, but it is particularly susceptible to checking and cracking. Checking and cracking are objectionable, as they permit entrance of the water into the insulating material, thereby lessening its insulating efficiency. In order to obtain satisfactory waterproofness, cement plaster is conventionally applied in layers approaching three-quarters of an inch in thickness. The material, on curing, shrinks considerably, which causes extensive cracking and checking. In an effort to lessen checking, a cement plaster wall is frequently scored in four foot squares, the theory being that a crack would stop at a scoreline and not pass into an adjoining square. Hence, it is seen that a person utilizing a cement plaster wall is reconciled to at least a certain amount of cracking and checking. Cement plaster, while it could be used without too much difficulty on vertical walls, proved particularly objectionable as a coating material for ceilings, primarily because of the heavy weight of the necessarily thick layer that had to be applied. As could be expected, this high weight cement plaster ceiling had a relatively high tensile stress at the interface of the plaster and insulating material, which frequently culminated in falling plaster. In those instances where the adhesive properties were satisfactorily high so as to avoid separation at the interface, there still occasionally occurred a failure in the insulating material itself, again caused by the excessive weight. To remedy this situation, metal laths are sometimes employed to offer better mechanical bonding for the plaster, but this expediency is, in a way self-defeating, as the metal anchors for the metal laths are passed through the insulating wall to obtain firm support and hence serve as conductors for the passage of heat into the interior of the cooler. Cement plaster has another shortcoming in that its surface must be covered with several coats of paint in order to provide a smooth, easily cleaned surface.

Because of the foregoing shortcomings of the cement plaster wall, the inside wall surface of many coolers are coated with an asphalt emulsion mastic. The asphalt mastic coating has adhesive properties superior to the cement plaster and because it may be applied in a relatively thin layer there is no problem of bonding a heavy coating to the ceiling as in the instance of cement plaster. Unfortunately, the asphalt mastic must be cured for at least 30 days after application to the wall before the cooler may be operated at ordinary refrigerating temperatures. This has resulted in holding refrigerators out of production for long periods of time, whenever it becomes necessary to refinish the wall. Painting of the asphalt mastic coating is delayed until curing is complete. A mastic wall, while it is an improvement over the cement plaster may crack to some extent as a result of the shrinkage occurring during curing. Asphalt walls, after a period of years, will evidence cracking which is attributed to thermal fatigue. By this it is meant that the wall will develop cracks if the temperature of the cooler should be repeatedly raised and lowered. An asphalt mastic coating loses some of its adhesive characteristics with time. Asphalt mastic emulsions are particularly sensitive to freezing and thawing and must be held at temperatures above freezing before and during application, although when once properly cured the asphalt mastic coated wall will not be damaged by subfreezing temperatures.

Our improved composition exhibits remarkable non-checking and non-cracking properties and possesses outstanding adhesive properties. Both the cement plaster and the asphalt mastic coating heretofore used were particularly objectionable because of their cracking and checking tendencies. A wall coated with our product, even under abusive treatment of repeated raisings and lowerings of temperatures within the refrigerated chamber, will not crack or check to an appreciable extent.

The composition of our invention on curing undergoes little or no shrinkage and this, no doubt, accounts for its freedom from cracks and checks. The material can be applied in a relatively thin coat and in the instance of refrigerator coatings, a layer of 1/8 inch is suitable. This is much thinner than the cement plaster coating of 3/4 inch normally applied. The weight advantages are readily apparent. The composition when applied to a wall gives a surface which is relatively easy to maintain and one which does not require painting. This is a decided improvement over the asphalt mastic coating and cement plaster formerly used. The composition has outstanding adhesive properties and will even cling to flat metal surfaces. Because of its improved adhesive properties, the undersurface does not need to be specially prepared before receiving the coat. The material has excellent waterproof properties and will transmit water vapors. The material may be applied to a wall with substantially less labor than required in the putting up of a cement plaster or asphalt coating and has improved troweling and working characteristics and may be applied at lower temperatures, making it no longer necessary to heat up a refrigerated area as was formerly required when patching with cement or asphalt mastic emulsion. An additional advantage over the use of an asphalt mastic emulsion is that there is no prolonged period for curing. In one instance, the material of our invention was placed on a wall at a temperature around 32°, the refrigerated space was then immediately dropped to 28° and held for some period of time. The surface wall cured with no difficulty and without the occurrence of checks or cracks. The material has proven to have a very low coefficient of expansion and contraction.

The outstanding adhesive properties of our composition makes it particularly effective as an adhesive for installing ceramic wall tiles and the like. The product may be used as a caulking compound to seal the cracks between, say a bathtub and the adjoining wall. The product has been successfully used as a filler for dents of a metal automobile body, which use strikingly demonstrates the outstanding adhesive properties of the material. The product may be used as a bonding agent for masonry materials, and is capable of binding together divergent types of materials. The composition is suitable for use as a patching material for stopping water seepage in basement walls.

The mixed product in a form ready for immediate use contains as its principal ingredients, waterproof white Portland cement, a water soluble acrylic type resin, aggregate, a water soluble siliconate, and an adequate amount of gaging water to place the mixture in a desirable working form. From our experience commercially available waterproof white Portland cement is most suitable for our purpose. The cement used must be both of the white variety and waterproof, otherwise the composition, when applied, will check or crack. White Portland cement is a recognized type of cement which contains a relatively smaller amount of iron oxide than the gray variety. A typical gray Portland cement may contain 2.8% or more iron oxide, while a representative white Portland cement will generally have less than 0.50%. The sulphur trioxide content of the gray variety is generally considerably higher, approximately twice as much and in the neighborhood of 2.5%. Portland cements are commonly waterproofed by the incorporation during manufacture of a small portion of stearic acid or its calcium or aluminum salts.

Resins that may be used in our formulation must be water dispersible and form both a mechanically stable and chemically stable aqueous emulsion. Considerable mechanical agitation is required to blend together the several dry ingredients and the liquid portion. A mechanically stable emulsion will assure that no coagulation of the emulsion will occur during formulation. The resin in aqueous emulsion must be chemically stable against coagulation in the presence of Portland cement. We have found acrylic type resins, generally speaking, may be used for our purposes. Particular polymers that may be used include the copolymer of methyl acrylate (sometimes referred to as simply acrylate) and methyl methacrylate, the copolymer of methyl methacrylate and ethyl methacrylate, and the copolymer of methyl acrylate and ethyl methacrylate. The preferred polymer is the copolymer of methyl acrylate and methyl methacrylate. The foregoing resins are water dispersible or water emulsifiable and are compatible with the alkaline aqueous mixture of Portland cement. Most of these acrylic type resins are commercially available in an aqueous emulsion (40 to 50% solids generally). We have found that the resin may be used in the formula of the insulation adhesive and finish composition in parts by weight (on a solid basis) within the range of 5–50 for 50 parts by weight of the white Portland cement. Water is used in an amount adequate to provide a readily workable mixture, and in an amount sufficient to hydrate the product. However, there is no concern about using enough to provide hydration, as the water will be used in amounts larger than that required for hydration in order to obtain a workable or placeable mixture. The amount of water employed will vary considerably, depending upon the type and amounts of ingredients used and the requirements of the workmen. It has been our general experience that the use of less than 5 parts by weight of the solid resin results in an appreciable loss of the adhesive property of the composition, while the use of amounts of the resin in excess of 50 parts by weight causes excessive checking and cracking and provides a composition which sets up too hard. We prefer to use, as the siliconate, a commercially available salt of siliconic acid known as sodium methyl siliconate in an amount of 0.02–0.5 part by weight. Various water soluble alkali metal siliconates may be employed, among them are sodium and potassium methyl and ethyl siliconate. Sodium methyl siliconate is particularly effective. It has been our general experience that the use of less than 0.02 part of the siliconate will not impart the desirable non-cracking and non-checking characteristics and that amounts in excess of 0.50 leaves the coated surface more or less permanently soft. The use of the siliconate improves greatly the trowelability of the composition.

The aggregate may be used in amounts of 5 to 300 parts by weight per 50 parts of the cement. Silicon dioxide, either quartz or sand, in mesh size of 20 to 80 are preferably employed. Particles of a mesh size less than 100 are to be avoided as aggregate of such small size tend to cause cracking of the wall coated with the composition. Aggregate larger than 20 mesh is acceptable providing there is no objection to a rough surface. The aggregate of our preferred formulation, if passed through a series of superimposed sieves having mesh sizes from top to bottom of 20, 30, 40, 50, 70, 80, 90, and 100 respectively, will separate as follows: None of the aggregate will be retained by the first sieve, 1.2% of the total weight will remain on the 30 mesh sieve, and the 40 mesh sieve will stop 25.4% of the total aggregate, the 50 mesh sieve 40.9%, the 70 mesh sieve 23.5%, the 80 mesh sieve 4.3%, and the 90 mesh sieve 4.7%. Other aggregates that may be utilized are slag, marble chips, granite chips and pearlite.

In the preferred embodiment of our composition, we use in addition to the foregoing ingredients a small amount of mica, along with titanium dioxide and asbestos. A 325 mesh mica is especially suitable. The use of the mica or other thickening agent will necessitate an increase in the amount of water in order to obtain a composition having a workable trowel consistency. The mica increases the waterproofness and if not used in too large an amount will impart some desirable troweling characteristics. The titanium dioxide is used as a pigment to increase the whiteness of the surface wall. The asbestos offers more flexibility to a surface wall incorporating it and increases its structural strength. Wood or other fibers may be used in the place of or along with the asbestos. We recommend that the mica be added to the formulation in parts by weight not in excess of 60 parts, the titanium oxide in an amount up to 90 parts, and the asbestos not in excess of 90 parts.

The following examples are disclosed to specifically illustrate the improved hydraulic insulation adhesive and finish composition of our invention and are not intended to be limiting.

*Example I*

| | Parts by weight |
|---|---|
| Waterproof white Portland cement | 50 |
| Sand | 16.9 |
| Mica | 5.65 |
| Titanium dioxide | 5.65 |
| Asbestos | 2.42 |
| Resin | 9.18 |
| Water | 31.1 |
| Siliconate | 0.0605 |

The dry ingredients, which in this instance included the cement, sand, mica, titanium dioxide and asbestos, were mixed together in a rotary type concrete mixer until fully blended. The resin was in an aqueous emulsion (46% solids) and the siliconate, in the form of sodium methyl siliconate, was in a water solution. The liquids, including the resin, the added water, and the siliconate solution, were added to the powder blend in the mixer and the agitation continued to obtain a workable, trowelable mixture which closely resembles in consistency common plaster. The parts by weight of the siliconate and resin in the above table are on a solids basis. Because these latter two ingredients were combined with water, the free water actually added to the formulation was proportionately less than the total amount of water indicated in the table to account for that water associated with the resin and the siliconate. The formulation of this example is our preferred composition. It has exceptional non-checking and non-cracking characteristics and very good adhesive properties. The composition may be applied by a laborer using the normal techniques employed in applying finishes. There is no particular sequence for mixing the several ingredients, although it is preferred that the dry materials be first blended together and then the liquids added. The resin used is the copolymer of methyl acrylate and methyl methacrylate.

The hydraulic insulation adhesive and finish composition of this formula has been subjected to severe test conditions. A coating of the formulation was applied in about 1/16" thickness in one coat to a wall area of a freezer. Commencing in the neighborhood of 32° F., the freezer was held for prolonged periods of time at several temperatures down to −80° F. The freezer was held at each of the several temperatures for times adequate to assure that the coating had reached the temperature of the refrigerator. The coating was applied over a foam glass insulating wall. Foam glass is recognized to have a very low coefficient of expansion and contraction. There was no failure until the temperature of −80° F. was reached, when there occurred a minor shearing of the foam glass. The shearing was not of major importance but it was the first indication of any stress. This test would indicate that the cement composition of this invention has an extremely low coefficient of expansion and contraction.

We have found that when the composition of the above formulation is to be used to coat a wall up to the dado level, which is generally four or five feet from the floor, it is best that the mica be deleted from the composition. When the composition is being used as an adhesive for cement tile, the titanium dioxide may be left out.

*Example II*

| | Parts by weight |
|---|---|
| Waterproof white Portland Cement | 50 |
| Sand | 251 |
| Mica | 25.4 |
| Titanium dioxide | 25.4 |
| Asbestos | 10.9 |
| Resin | 41.3 |
| Water | 139.0 |
| Siliconate | 0.0262 |

The siliconate used in the formulation of this example was sodium methyl siliconate in water solution. The resin is a copolymer of methyl acrylate and methyl methacrylate. It will be noted that the sand is present in approximately five times the amount of the cement, which is nearly the reverse of formulation of Example I. A wall coated with the present formulation was free from cracking, but it did have a much rougher surface than the wall coated with the Example I formulation. The present coating would not be readily cleanable because of the roughness; however, it may be used in areas where such is not objectionable or where the surface may be painted to give a cleanable, smooth surface, or a decorative surface.

*Example III*

| | Parts by weight |
|---|---|
| Waterproof white Portland Cement | 50 |
| Sand | 16.9 |
| Mica | 5.65 |
| Titanium dioxide | 5.65 |
| Asbestos | 2.42 |
| Resin | 6.05 |
| Water | 34.2 |
| Siliconate | 0.0605 |

It will be noted that the cement-sand ratio of this formulation is the same as the formulation of Example I. However, the amount of resin has been reduced approximately 1/3. The coating of this example has considerably less adhesive strength than that of the earlier two examples. However, it may be used advantageously where the coated insulated material has a low internal tensile strength. When the internal tensile strength of the wall material is low, it is generally thought that there is no point in providing a high tensile bonding at the interface of the insulated material and its coating. The material of this example is suitable for such use.

Obviously many modifications and variations of the invention as hereinbefore set forth may be made without departing from the spirit and scope thereof, and therefore only such limitations should be imposed as are indicated in the appended claims.

We claim:

1. An improved insulation adhesive and finish composition having exceptional non-checking and non-cracking characteristics and improved adhesive properties, said composition consisting essentially of a mixture of the following ingredients with each of said ingredients being present in parts by weight within the ranges indicated:

| | Parts by weight |
|---|---|
| Waterproof white Portland cement | 50 |
| A copolymer of a lower alkyl ester of methacrylic acid and an ester selected from the group consisting of a lower alkyl ester of methacrylic acid and a lower alkyl ester of acrylic acid | 5–50 |
| Aggregate at least as large as mesh size 100 | 5–300 |
| A water-soluble alkali metal salt of siliconic acid | 0.02–0.5 |

and water present in an amount adequate to provide a workable consistency.

2. A composition as described in claim 1 and containing in addition thereto mica, titanium dioxide and asbestos.

3. A composition as described in claim 1 wherein the copolymer employed is the copolymer of methyl acrylate and methyl methacrylate.

4. A composition as described in claim 1 wherein the copolymer employed is the copolymer of methyl methacrylate and ethyl methacrylate.

5. A composition as described in claim 1 wherein the copolymer employed is the copolymer of methyl acrylate and ethyl methacrylate.

6. A composition as described in claim 1 wherein the water-soluble alkali metal salt of siliconic acid is sodium methyl siliconate.

7. A composition as described in claim 1 wherein the copolymer employed is the copolymer of methyl acrylate and methylmethacrylate and the water-soluble alkali metal salt of siliconic acid is sodium methyl siliconate.

8. An improved hydraulic insulation adhesive and finish formulation which may be placed in a workable form with the addition of water consisting essentially of:

| | Parts by weight |
|---|---|
| Waterproof white Portland cement | 50 |
| Aggregate at least as large as mesh size 100 | 5–300 |
| A copolymer of a lower alkyl ester of methacrylic acid and an ester selected from the group consisting of a lower alkyl ester of methacrylic acid and a lower alkyl ester of acrylic acid | 5–50 |
| A water-soluble alkali metal salt of siliconic acid | 0.02–0.5 |

9. A hydraulic insulation adhesive and finish formulation in accordance with claim 8 wherein the copolymer employed is the copolymer of methyl acrylate and methyl methacrylate.

10. A hydraulic insulation adhesive and finish formulation in accordance with claim 8 wherein the copolymer employed is the copolymer of methyl acrylate and methyl methacrylate and the water-soluble alkali metal salt of siliconic acid is sodium methyl siliconate.

11. An improved insulation adhesive and finish composition having exceptional non-checking and non-cracking characteristics and improved adhesive properties, said composition consisting essentially of a mixture of the following ingredients with each of said ingredients being approximately present in parts by weight as indicated:

| | Parts by weight |
|---|---|
| Waterproof white Portland cement | 50 |
| Copolymer of methyl acrylate and methyl methacrylate | 9.2 |
| Aggregate at least as large as mesh size 100 | 16.9 |
| Sodium methyl siliconate | 0.06 |

and water present in an amount adequate to provide a workable consistency.

12. An improved hydraulic insulation adhesive and finish formulation which may be placed in a workable form with the addition of water consisting essentially of

| | Parts by weight |
|---|---|
| Waterproof white Portland cement | 50 |
| Copolymer of methyl acrylate and methyl methacrylate | 9.2 |
| Aggregate at least as large as mesh size 100 | 16.9 |
| Sodium methyl siliconate | 0.06 |

References Cited in the file of this patent

UNITED STATES PATENTS

| | | |
|---|---|---|
| 2,711,967 | Tomarkin | June 28, 1955 |
| 2,750,302 | Carmarda et al. | June 12, 1956 |
| 2,769,794 | Coler et al. | Nov. 6, 1956 |

FOREIGN PATENTS

| | | |
|---|---|---|
| 635,486 | Great Britain | Apr. 12, 1950 |

OTHER REFERENCES

"Industrial and Engineering Chemistry," Volume 46, No. 2, pages 382–384, February 1954.